United States Patent
Ueno

(10) Patent No.: US 7,404,208 B2
(45) Date of Patent: Jul. 22, 2008

(54) FUNCTION RESTRICTION RELEASE METHOD FOR AN IMAGE PROCESSING APPARATUS, AND APPARATUS EMPLOYING SAME

(75) Inventor: Toshihiro Ueno, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 991 days.

(21) Appl. No.: 10/600,456

(22) Filed: Jun. 23, 2003

(65) Prior Publication Data

US 2004/0034792 A1 Feb. 19, 2004

(30) Foreign Application Priority Data

Jun. 26, 2002 (JP) ............................ 2002-186361

(51) Int. Cl.
*G06F 13/00* (2006.01)
(52) U.S. Cl. ...................................................... 726/17
(58) Field of Classification Search .................. 726/17, 726/16, 18, 31
See application file for complete search history.

(56) References Cited

U.S. PATENT DOCUMENTS

| 5,901,228 | A | * | 5/1999 | Crawford | ..................... | 705/34 |
| 2001/0022617 | A1 | * | 9/2001 | Takaba et al. | ............... | 348/207 |
| 2001/0034713 | A1 | * | 10/2001 | Nakai et al. | ................... | 705/52 |
| 2003/0028786 | A1 | * | 2/2003 | Mustafa | ..................... | 713/189 |

FOREIGN PATENT DOCUMENTS

JP 2001-309099 11/2001

* cited by examiner

*Primary Examiner*—Kambiz Zand
*Assistant Examiner*—Aubrey H Wyszynski
(74) *Attorney, Agent, or Firm*—Nixon & Vanderhye, P.C.

(57) ABSTRACT

In the context of an electronic appliance such as an image processing apparatus incorporating a restricted scanner function in addition to standard copier and printer functions, when releasing the restriction on the restricted scanner function, a function restriction release program capable of releasing the restriction on the restricted scanner function might be made to run on a host PC, the restriction on the restricted scanner function at the electronic appliance being automatically released at a time when this host PC is connected to the electronic appliance.

5 Claims, 5 Drawing Sheets

Function restriction information storage unit

| No. | Host ID |
|---|---|
| 1 | hostA |
| 2 | |
| 3 | |

FUNCTION RESTRICTION RELEASE METHOD FOR AN IMAGE PROCESSING APPARATUS, AND APPARATUS EMPLOYING SAME

BACKGROUND

1. Technical Field

The present invention relates to an image processing apparatus or other such electronic appliance, and in particular relates to a function restriction release method for an image processing apparatus (compound device) or other such electronic appliance incorporating a plurality of functions such as copier function, printer function, scanner function, and/or the like, where use of one or more of those functions is restricted, and relates to such an electronic appliance.

2. Conventional Art

With image processing apparatuses and other such electronic appliances, in addition to standard function(s) provided initially at the time of shipment, it is sometimes the case, due to changes in usage conditions/environment or the like at user sites, that function expansion is carried out so as to permit addition of new function(s) after equipment has been shipped and put on market.

Conventional methods for implementing function expansion include (1) methods which accomplish function expansion through ROM replacement, program addition/revision for accommodation of new function(s), or the like, and (2) methods wherein programming for function expansion is provided in advance at the time of shipping, programming for function expansion being enabled as a result of entry of function restriction release key sequence(s) from an operation panel or remote panel (e.g., Japanese Patent Application Publication Kokai No.2001-309099).

But of the foregoing function expansion methods, because the method at (1) requires specialized technical knowledge in order to carry out ROM replacement, program addition/revision, or the like, the manufacturer or dealer must perform the expansion procedure, as the user does not have the wherewithal to perform same. Furthermore, before such an apparatus can be shipped, the manufacturer must have programming available for each model, whereas the manufacturer conducts verification of operation with respect to all functions of the apparatus at the time of manufacturing. Taking the example of a model which is provided with copier function, printer function, and scanner function, and a model which is provided with only printer function and copier function, before either can be shipped it will be necessary to have separate programming made available for each, the resulting reduction in manufacturing efficiency representing a further problem in addition to the already-high parts cost.

On the other hand, with the method at (2), because the programming for function expansion is provided in advance, it is possible to avoid such problems as were indicated for the method at (1). However, with the method at (2), there are problems such as the following.

First, whereas a more expensive image processing apparatus or other such electronic appliance might be equipped with an easy-to-use operation panel or the like from which the release key sequence for function restriction release can be entered, permitting function restriction release to be carried out, it is often the case that a less expensive electronic appliance is not provided with an operation panel such as will permit entry of the release key sequence. Furthermore, while it might be possible to carry out a procedure by which the release key sequence is entered from a host PC (host personal computer), because—whether the release key sequence is entered from an operation panel or whether this is accomplished through a remote operation from a host PC—this would not be among the settings of the electronic appliance which a user would normally have cause to use with any great frequency, it may be the case that the location at which such a release key sequence would have to be entered is buried at a deep level or that it can only be made accessible after first carrying out some special operation. Furthermore, because the release key sequence must be entered accurately, the operation which must be performed will appear complicated to a user unfamiliar with such equipment.

SUMMARY

The exemplary embodiments of the present invention were conceived in light of circumstances such as the foregoing, it being an object thereof to provide an electronic appliance function restriction release method permitting function restriction(s) to be easily released even at inexpensive electronic appliance(s) not equipped with operation panel(s) permitting entry of release key sequence(s) or other such complicated operation(s), and an electronic appliance permitting implementation of such function restriction release method.

In the context of one or more electronic appliances incorporating one or more restricted functions in addition to one or more standard functions, an electronic appliance function restriction release method in accordance with one or more embodiments of the present invention is a method for releasing at least one restriction of at least one of the restricted function or functions, the method being characterized in that it comprises one or more function restriction release program execution steps wherein one or more function restriction release programs capable of releasing at least one restriction of at least one of the restricted function or functions is caused to be executed on one or more host computers; one or more communication steps wherein communication is carried out between or among at least one of the host computer or computers and at least one of the electronic appliance or appliances at one or more times when at least one of the host computer or computers is connected to at least one of the electronic appliance or appliances; and one or more function restriction release steps wherein at least one restriction of at least one of the restricted function or functions at at least one of the electronic appliance or appliances is released.

In accordance with the electronic appliance function restriction release method of one or more embodiments of the present invention, because it is possible to release restriction(s) of restricted function(s), e.g., restriction(s) with respect to use of scanner function(s), at electronic appliance(s) by merely causing function restriction release program(s) to be executed on host computer(s) and causing host computer(s) to be connected to electronic appliance(s), it is possible to easily release function restriction(s) even at inexpensive electronic appliance(s) not equipped with operation panel(s) permitting complicated operation(s). Furthermore, because it is sufficient to carry out operation(s) such as installation at host computer(s) of recording medium or media on which function restriction release program(s) is or are recorded, there being no need to carry out entry of release key sequence(s) or other such complicated and special operation(s), it will be possible for even a user unfamiliar with such equipment to easily release function restriction(s).

An electronic appliance function restriction release method according to one or more embodiments of the present invention may be characterized in that it further comprises one or more identification steps wherein at least one host computer that has carried out at least a portion of the electronic appliance function restriction release processing is identified; and one or more function enabling steps wherein at least one function subject to function restriction release is enabled for only at least one of the host computer or computers identified at at least one of the identification step or steps as having carried out at least a portion of the electronic appliance function restriction release processing.

In accordance with the electronic appliance function restriction release method of one or more embodiments of the present invention, it is possible to carry out license management such that the number of users made capable of using function(s) released by function restriction release program(s) is restricted. For example, where there are a plurality of host computers connected on a network, management may be carried out such that scanner function(s) is or are enabled for only that or those host computer(s) for which scanner function restriction(s) has or have been released, scanner function(s) being disabled for the other host computer(s).

An electronic appliance function restriction release method according to one or more embodiments of the present invention may be characterized in that it further comprises one or more function restriction status determination steps wherein, in the event that one or more drivers capable of controlling at least one of the electronic appliance or appliances is or are installed on at least one of the host computer or computers, at least one status of at least one restricted function of at least one of the electronic appliance or appliances is determined when at least one of the host computer or computers is connected to at least one of the electronic appliance or appliances; one or more driver enabling steps wherein, in the event that one or more function restrictions has or have been released, at least one driver for at least one of the restricted function or functions is enabled; and one or more driver disabling steps wherein, in the event that one or more function restrictions has or have not been released, at least one driver for at least one of the restricted function or functions is disabled.

In accordance with the electronic appliance function restriction release method of one or more embodiments of the present invention, restricted function(s) of electronic appliance(s) may be linked to driver function(s) at host computer(s); e.g., where a scanner driver for a restricted scanner function is installed at a host computer, the scanner driver may be enabled when the host computer is connected to an electronic appliance at which the scanner function is permitted to be used, and the scanner driver may be disabled when the host computer is connected to an electronic appliance at which the scanner function restriction has not been released. Accordingly, because it is possible when the user connects the host computer to the electronic appliance to determine whether an electronic appliance is an apparatus which is permitted to use the scanner function or an apparatus which is not permitted to use the scanner function, ease of operation is improved.

An electronic appliance according to one or more embodiments of the present invention incorporates one or more restricted functions in addition to one or more standard functions and is characterized in that it is equipped with one or more controllers capable, when release information for release of one or more function restrictions is sent thereto from one or more host apparatuses, of causing at least one restriction of at least one of the restricted function or functions to be released based on at least a portion of the release information.

In accordance with the electronic appliance of one or more embodiments of the present invention, because user(s) can cause restriction(s) of restricted function(s), e.g., restriction(s) with respect to use of scanner function(s), to be released merely by carrying out operation(s) such as, say, causing a function restriction release program to be executed on a host apparatus (host PC), as a result of which release information may be sent from the host apparatus to the electronic appliance, it is possible to easily release function restriction(s) even at inexpensive electronic appliance(s) not equipped with operation panel(s) permitting complicated operation(s). Furthermore, because there is no need to carry out entry of release key sequence(s) or other such complicated and special operation(s), it will be possible for even a user unfamiliar with such equipment to easily release function restriction(s)

An electronic appliance according to one or more embodiments of the present invention may be characterized in that it is constructed such that information associated with at least one of the host apparatus or apparatuses from which at least a portion of the function restriction release information was sent is registered at one or more storage units, and at least one of the function or functions subject to function restriction release is enabled for only at least one of the registered host apparatus or apparatuses.

In accordance with the electronic appliance of one or more embodiments of the present invention, it is possible to carry out license management such that the number of users capable of using electronic appliance(s) for which function restriction(s) has or have been released is restricted. For example, where there are a plurality of host apparatuses (host PCs) connected on a network, management may be carried out such that scanner function(s) is or are enabled for only that or those host apparatus(es) sending scanner function restriction release information, scanner function(s) being disabled for the other host apparatus(es).

BRIEF DESCRIPTION OF DRAWINGS

FIG. 4 (b), being a flowchart showing content of processing in a third exemplary embodiment of the present invention, shows steps occurring following a request to use scanner function at a host PC.

DESCRIPTION OF PREFERRED EXEMPLARY EMBODIMENTS

Below, exemplary embodiments of the present invention are described with reference to the drawings.

First Exemplary Embodiment

Figure 1:
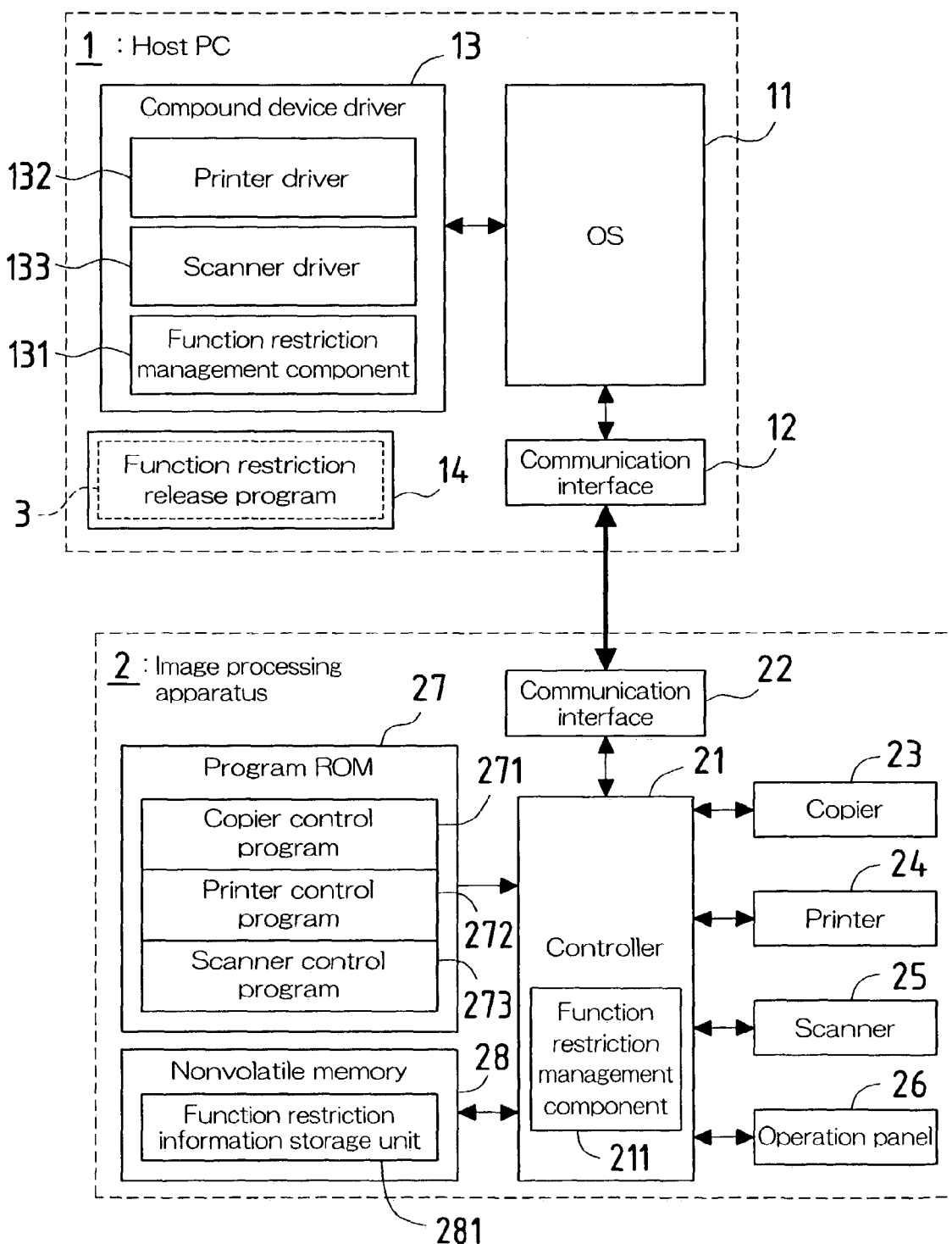
FIG. 1, being a drawing to assist in explaining a first exemplary embodiment of the present invention, is a drawing showing a block diagram showing the constitution of a host PC, together with a block diagram showing the constitution of an image processing apparatus.

First, the first exemplary embodiment is an application of the present invention to an image processing apparatus serving as electronic appliance. More specifically, incorporated within an image processing apparatus (compound device) are copier function, printer function, and scanner function; and, of these three functions, use of the scanner function is restricted as of the time of shipment. Shown in block diagrammatic fashion at FIG. 1 are the respective constitutions of this image processing apparatus and a host PC serving as host apparatus.

Host PC 1 comprises PC main body (not shown) comprising a CPU, ROM, RAM and so forth; OS 11 representing a basic program for running the PC; communication interface 12 for sending and receiving information to and from image processing apparatus 2 or other such guest apparatus; compound device driver 13; and read device 14 for reading recording media (e.g. CD-ROM) on which there is recorded various programming/data and/or function restriction programming (described below).

Compound device driver 13 comprises function restriction management component 131, printer driver 132, and scanner driver 133. Function restriction management component 131 carries out such operations as processing to determine status of function restriction(s) at image processing apparatus 2, management of operation of scanner driver 133 (described in detail below), and so forth.

Image processing apparatus 2 comprises communication interface 22 for sending and receiving information to and from host PC 1 or other such host apparatus; copier 23; printer 24; scanner 25; operation panel 26 for performing simple operations such as operations for turning power supply ON and OFF, paper feed, and so forth; program ROM 27; nonvolatile memory 28; and controller 21 for controlling various components of image processing apparatus 2 based on program(s) stored in program ROM 27. Stored within program ROM 27 are copier control program 271, printer control program 272, and scanner control program 273.

Controller 21 comprises function restriction management component 211, this function restriction management component 211 locking restriction(s) on scanner function(s), i.e., locking operation of scanner control program 273. Furthermore, provided within nonvolatile memory 28 is function restriction information storage unit 281 for storing function restriction information in connection with restriction of such scanner function(s), the ID of host PC 1 and other such information related to function restriction(s), and the like.

Function restriction management component 211 executes: processing for release of lock(s) on scanner control program 273 when release command(s) is or are sent from host PC 1; processing for storing, at function restriction information storage unit 281, the ID of host PC 1 and other such information related to function restriction(s); processing for sending function restriction information to host PC 1; and so forth.

Figure 2:
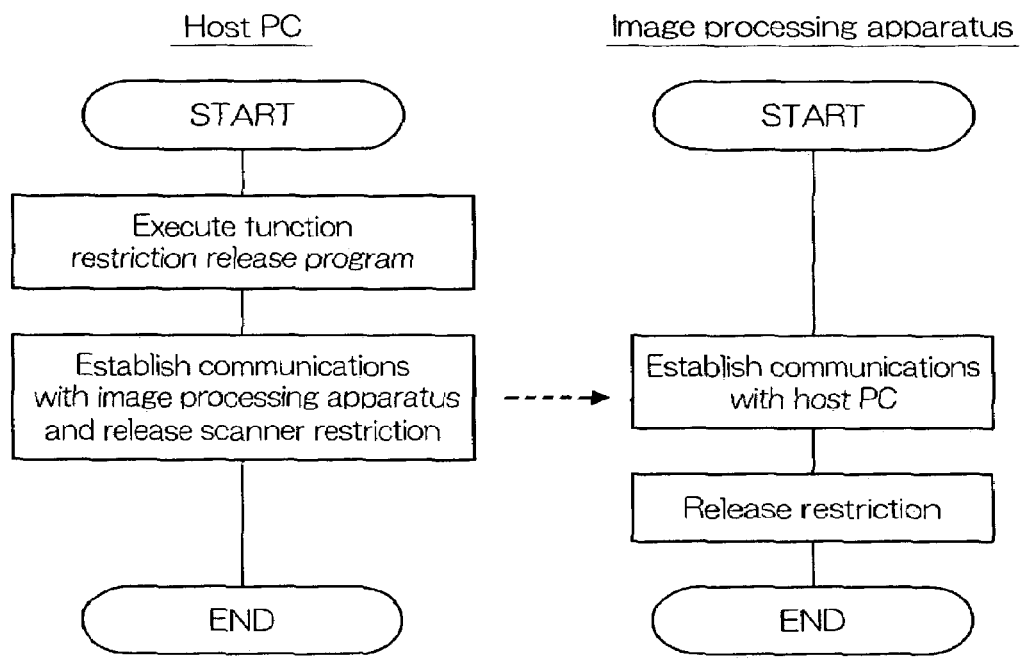
FIG. 2 is a flowchart showing an example of the sequence of processing during function restriction release in a first exemplary embodiment of the present invention.

Next, referring to the flowchart of FIG. 2, a sequence of processing for function restriction release will be described.

First, a user might purchase recording media (e.g., CD-ROM) on which there is recorded a function restriction release program 3 for releasing the restriction on a scanner function, and might install that function restriction release program 3 at host PC 1 and might execute same. Alternatively, function restriction release program 3 might be executed directly from recording media.

Upon executing function restriction release program 3 at host PC 1, host PC 1 and image processing apparatus 2 might be connected and a release command for releasing the restriction on the scanner function might be sent from host PC 1 to image processing apparatus 2. In addition, controller 21 (function restriction management component 211) of image processing apparatus 2 might, after receiving the release command, release the operational lock on scanner control program 273 (scanner function restriction release).

Thus, because the user can cause restriction(s) on scanner function(s) to be automatically released merely by installing function restriction release program 3 at host PC 1, the first embodiment permits function restriction release operations to be carried out easily.

Second Exemplary Embodiment and Third Exemplary Embodiment

Figure 3:
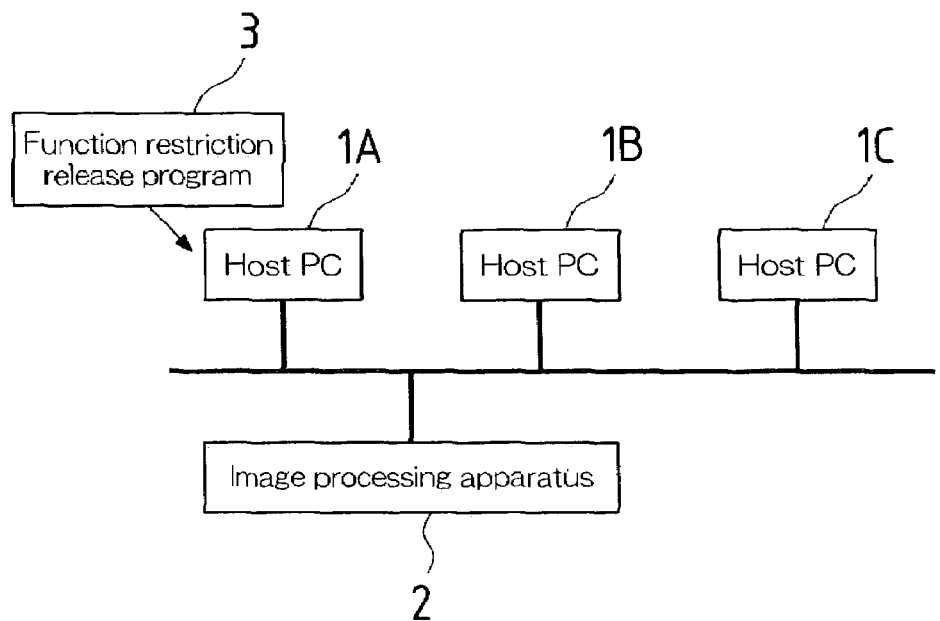
FIG. 3 is a drawing to assist in explaining a second exemplary embodiment of the present invention.

Next, in a second exemplary embodiment as shown in FIG. 3, where a single image processing apparatus 2 is connected by way of a network to a plurality of host PCs 1A through 1C, it is possible by executing function restriction release program 3 at any one host PC (e.g., host PC 1A) among plurality of host PCs 1A through 1C to cause the other host PCs 1B, 1C on the network to be able to use the scanner function of the image processing apparatus 2 at which function restriction release was carried out despite the fact that such scanner function restriction release was carried out only once.

Or, where a plurality of host PCs 1A through 1C are connected to a single image processing apparatus 2 by way of a network in the same fashion as is shown in FIG. 3, it is nonetheless possible to cause the scanner function to be made available for use only at host PC(s) where function restriction release has been carried out if license management is to be implemented such that the number of users capable of using the scanner function (number of licenses) is to be restricted. A third ememplary embodiment representing a specific example of a preferred arrangement under such circumstances will be described while referring to FIG. 3 as well as FIG. 4(a) and FIG. 4(b).

First, function restriction release program 3 is executed at host PC 1A, this being one of a plurality of host PCs 1A through 1C which are connected on a network, and the restriction on the scanner function at image processing apparatus 2 is released. Next, as a result of communication between the host PC 1A at which function restriction release program 3 was executed and image processing apparatus 2, function restriction management component 211 of image processing apparatus 2 acquires a host ID (hostA) from host PC 1A and registers same at function restriction information storage unit 281 (see FIG. 4(a) and FIG. 5).

Figure 4:
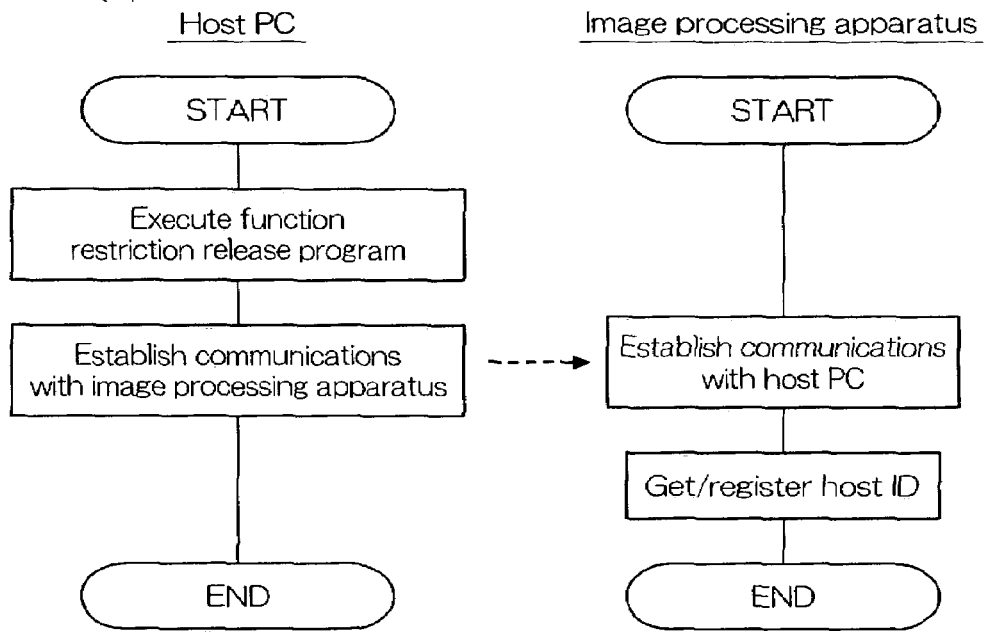
FIG. 4 (a), being a flowchart showing content of processing in a third exemplary embodiment of the present invention, shows steps occurring up to host ID registration at a host PC.
Figure 4:
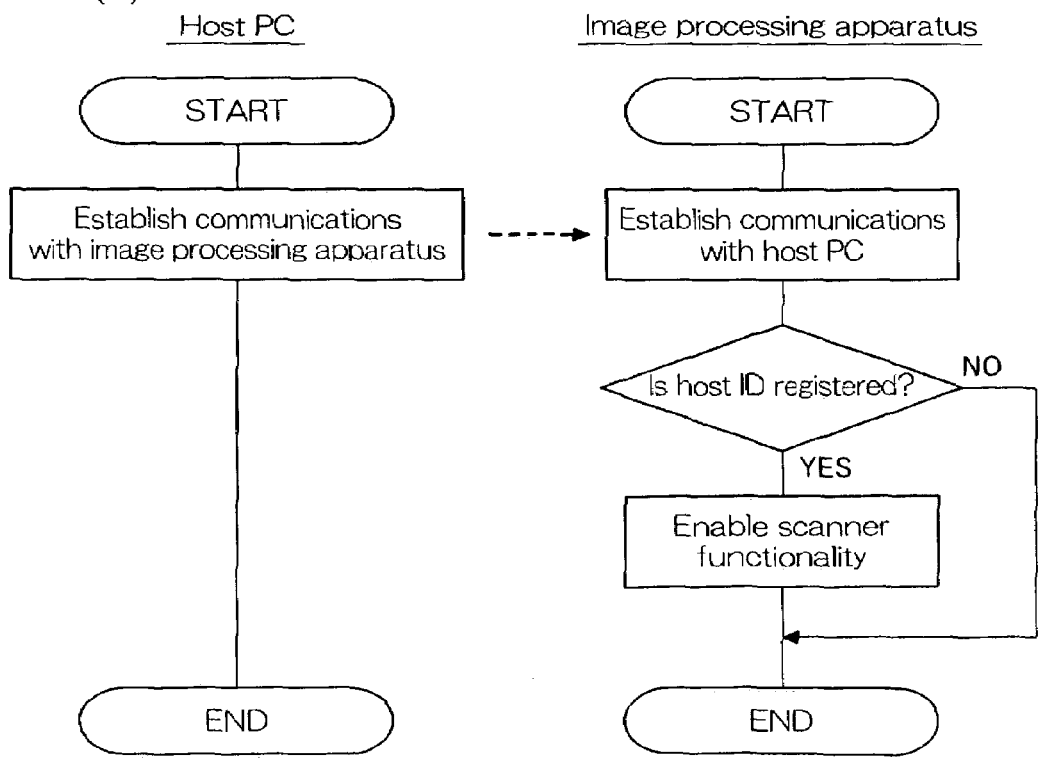

By thus registering the host PC 1A at which function restriction release program 3 was executed, it will be possible, in the event that there is a request to use the scanner function from the plurality of host PCs 1A through 1C present on the network, to identify the host PC 1A at which the restriction on the scanner function was released and it will be possible to carry out management such that use of the scanner function is enabled only for that host PC 1A but use of the scanner function is disabled for the other host PCs 1B, 1C, which were not registered therein (see FIG. 4(b)).

Fourth Exemplary Embodiment

Figures 5, 6:
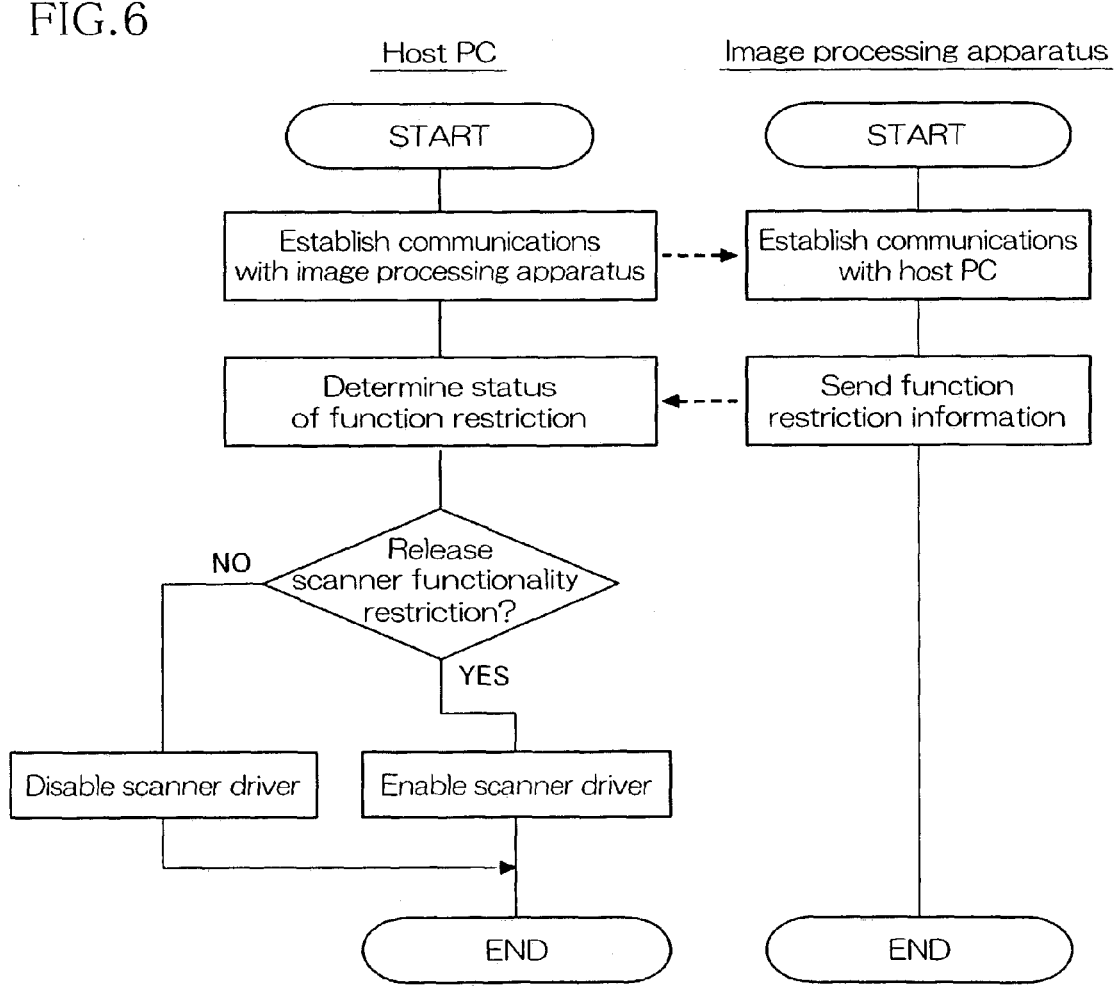
FIG. 5 is a drawing showing stored content at a function restriction information storage unit.
FIG. 6 is a flowchart showing content of processing in a fourth exemplary embodiment of the present invention.

Next, in a fourth exemplary embodiment, an example of management of operation of scanner driver 133 (FIG. 1) installed at host PC 1 is described while referring to the flowchart of FIG. 6.

More specifically, as shown in FIG. 6, operation (enablement/disablement) of scanner driver 133 is managed as a result of processing such that host PC 1 connects to and establishes communication with image processing apparatus 2, function restriction management component 131 of host PC 1 receives information (function restriction information) sent from function restriction management component 211 of image processing apparatus 2, and determines, based on that function restriction information, whether the restriction has been released from the scanner function of image processing apparatus 2 (i.e., whether the lock on scanner control program 273 has been released), enabling scanner driver 133 if the restriction has been released from the scanner function or disabling scanner driver 133 if the restriction has not been released from the scanner function.

As a result of managing scanner driver 133 in this fashion, since scanner driver 133 operates when host PC 1 is connected to an image processing apparatus 2 at which the scanner function is permitted to be used but scanner driver 133 does not operate when host PC 1 is connected to an image processing apparatus 2 at which the scanner function restriction has not been released, because it is possible when the user connects host PC 1 to an image processing apparatus 2 to determine whether the image processing apparatus 2 is an apparatus which is permitted to use the scanner function or an apparatus which is not permitted to use the scanner function, ease of operations is improved.

For example, were the scanner driver to operate when a host PC is connected to an image processing apparatus at which the scanner function restriction has not been released, a user might—despite the fact that scanning of an original cannot be executed—mount an original which the user desires to capture and press the scan button only to realize after some time has passed that such operations have been for nothing, but because carrying out scanner driver management as described above makes it possible to eliminate such disadvantageous circumstances, ease of operation is improved.

Other Exemplary Embodiments

Figure 7:
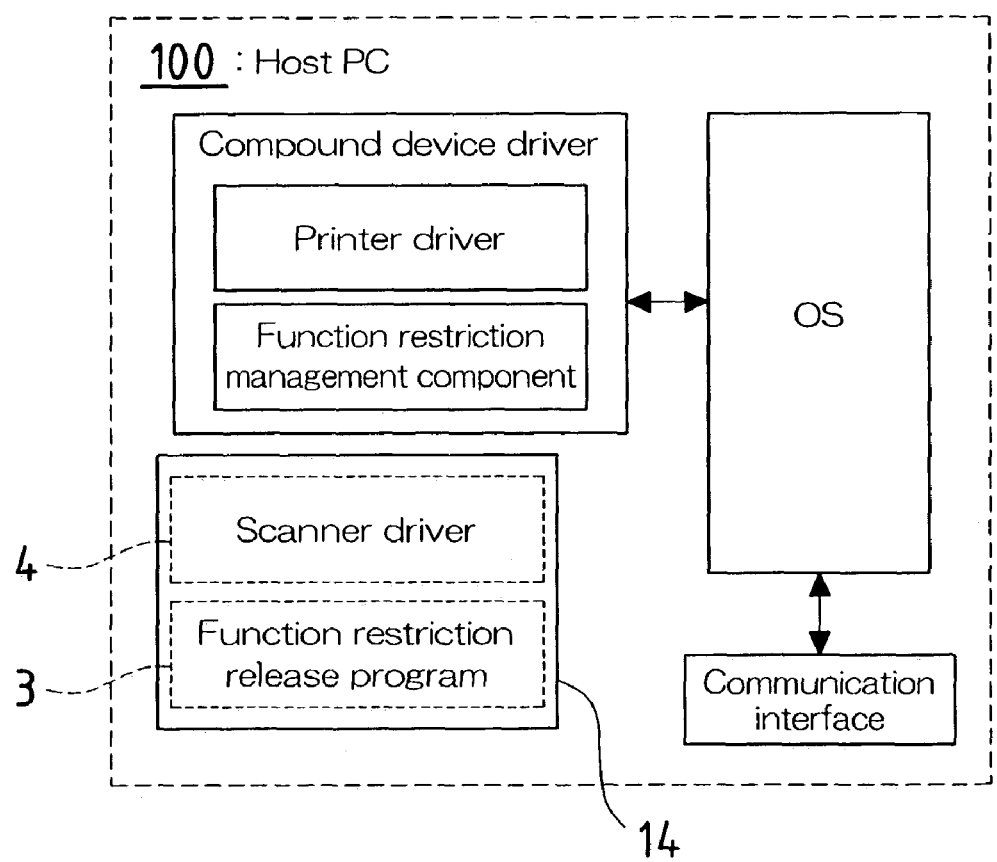
FIG. 7 is a block diagram showing another example of the constitution of a host PC.

Moreover, whereas the first exemplary embodiment shown in FIG. 1 depicts an example wherein scanner driver 133 is installed in advance on host PC 1 at the time of shipment, the present invention is not limited thereto, it being possible, for example as shown in FIG. 7, to either record the scanner driver 4 on the same recording medium or media (CD-ROM or the like) as the function restriction release program 3 or to record same on different recording medium or media, with scanner driver 4 and function restriction release program 3 being installed on host PC 100 at the time that function restriction release is carried out.

Here, as another example of a way in which function restriction release program 3 on recording media might be installed and executed, each time that image processing apparatus 2 is connected to a host PC 1 on which function restriction release program 3 is installed a function restriction management component might execute function restriction release program 3, with image processing apparatus 2 carrying out function restriction release for that host PC 1. In such a case, there will be no particular need for function restriction information storage unit 281. Alternatively, this may be stored for only as long as the power is ON at image processing apparatus 2 (in which case the function restriction information storage unit need only be volatile memory).

Whereas, in the foregoing exemplary embodiments, copier function and printer function were standard functions provided at the time of shipment, with the scanner function being provided as a restricted function, the present invention is not limited thereto, it being possible to have only the copier function provided as standard function at the time of shipment, with the printer function and scanner function being provided as restricted functions. Alternatively, it is possible to have only the copier function provided as standard function at the time of shipment, with either the printer function or the scanner function being provided as a restricted function.

In addition, the function(s) of the image processing apparatus are not limited to copier function, printer function, and/or scanner function, it also being possible to apply the invention to situations where image processing apparatuses incorporate any other arbitrary function(s) as standard function(s) and/or restricted function(s). Furthermore, the present invention is not limited to image processing apparatuses, it being possible to apply the present invention to a wide range of electronic appliances including information processing apparatuses, control apparatuses, and so forth.

Here, for purposes of the present invention, the recording medium or media on which the function restriction release program is recorded may be medium or media capable of carrying programming in fixed form, including magnetic tape, cassette tape, or other such tape-type media; FD (flexible disk)/HD (hard disk) or other such magnetic-disk- or CD-ROM/MO/MD/DVD or other such optical-disk-type media; IC card (including memory card)/optical card or other such card-type media; or mask ROM, EPROM, EEPROM, flash ROM, or other such semiconductor memory.

Furthermore, in an exemplary embodiment of the present invention, where system architecture is such that host PC(s) is or are capable of connecting to communication network(s) including the Internet, recording medium or media may carry programming in fluid form such that the function restriction release program can be downloaded from communication network(s). Moreover, where the function restriction release program is downloaded in such fashion from communication network(s), programming for performing such downloading may be stored in advance at the apparatus main body or may be installed from other recording medium or media.

The present invention may be embodied in a wide variety of forms other than those presented herein without departing from the spirit or essential characteristics thereof. The foregoing embodiments and working examples, therefore, are in all respects merely illustrative and are not to be construed in limiting fashion. The scope of the present invention being as indicated by the claims, it is not to be constrained in any way whatsoever by the body of the specification. All modifications and changes within the range of equivalents of the claims are moreover within the scope of the present invention.

Moreover, the present application claims right of benefit of prior filing date of Japanese Patent Application No. 2002-186361, the content of which is incorporated herein by reference in its entirety. Furthermore, all references cited in the present specification are specifically incorporated herein by reference in their entirety.

What is claimed is:

1. A method of releasing a restricted functionality of an electronic appliance, comprising:
   (1) a selected host device connected to said electronic appliance executing a functionality restriction release program to release the restricted functionality of said electronic appliance;
   (2) communicating, between the selected host device and said electronic appliance, information relating to the release of the restricted functionality of said electronic appliance, wherein the selected host device communicates said information to said electronic appliance;

(3) as a result of acts (1) and (2), releasing the restricted functionality of said electronic appliance;

the selected host device determining the status of said restricted functionality;

enabling a driver on said selected host device to control said released functionality on said electronic appliance; and disabling one or more drivers on one or more other host devices from controlling one or more functionalities of said electronic appliance for which a functionality restriction has not been released.

2. The method of claim 1, further comprising:

identifying one or more of said host devices; and wherein said restricted functionality of said electronic appliance is released so that said restricted functionality may be used by only one of said one or more host devices.

3. The method of claim 1, wherein said released functionality may be used by said selected host device connected to said electronic appliance.

4. The method of claim 1, further comprising releasing, as a result of said communicating act, the restricted functionality of said electronic appliance so that said functionality may be used by multiple host devices connected to said electronic appliance.

5. The method of claim 1, further comprising installing the functionality restriction release program stored on recording media.

* * * * *